(12) United States Patent
Swerdlow et al.

(10) Patent No.: US 11,138,368 B1
(45) Date of Patent: Oct. 5, 2021

(54) INCREASING COMMENT VISIBILITY

(71) Applicant: Google LLC, Mountain View, CA (US)

(72) Inventors: Andrew Swerdlow, San Francisco, CA (US); Nestor F. Hernandez, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/569,118

(22) Filed: Sep. 12, 2019

Related U.S. Application Data

(63) Continuation of application No. 15/697,200, filed on Sep. 6, 2017, now Pat. No. 10,452,772, which is a continuation of application No. 15/473,176, filed on Mar. 29, 2017, now Pat. No. 9,785,625, which is a continuation of application No. 13/929,683, filed on Jun. 27, 2013, now abandoned.

(51) Int. Cl.
*G06Q 30/02* (2012.01)
*G06F 40/169* (2020.01)
*G06F 16/33* (2019.01)
*G06Q 50/00* (2012.01)
*G06F 40/30* (2020.01)
*G06F 40/14* (2020.01)

(52) U.S. Cl.
CPC ........ *G06F 40/169* (2020.01); *G06F 16/3344* (2019.01); *G06F 40/30* (2020.01); *G06Q 30/0273* (2013.01); *G06Q 30/0276* (2013.01); *G06Q 30/0277* (2013.01); *G06Q 50/01* (2013.01); *G06F 40/14* (2020.01)

(58) Field of Classification Search
CPC ........ G06Q 30/02; G06Q 50/01; G06F 40/30; G06F 40/103
See application file for complete search history.

(56) References Cited

U.S. PATENT DOCUMENTS

| | | | |
|---|---|---|---|
| 7,831,928 B1 | 11/2010 | Rose | |
| 8,214,446 B1 | 7/2012 | Siegel et al. | |
| 8,326,684 B1 | 12/2012 | Halahmi et al. | |
| 2008/0281617 A1* | 11/2008 | Conrad | G06F 21/6218 705/346 |
| 2009/0271417 A1* | 10/2009 | Toebes | G06F 16/9537 |
| 2010/0030647 A1 | 2/2010 | Shahshahani | |

(Continued)

OTHER PUBLICATIONS

Chris Hogg, "Huffington Post offers sponsored comments, Tweets to advertisers", Dec. 15, 2009, 3 pages.

(Continued)

*Primary Examiner* — Vincent M Cao
(74) *Attorney, Agent, or Firm* — Fish & Richardson P.C.

(57) ABSTRACT

Methods, systems, and apparatus for increasing comment visibility are described. In one aspect, a method includes receiving a comment request for a comment to be included in a comments field of a content page, determining that the comment will be hidden from users when online content is presented to the users based on a number of other comments presented in the comments field exceeding a threshold number, and modifying a position of the comment in relation to positions of the other comments presented in the comments field to increase visibility of the comment to the users, including modifying the position of the comment from a first position that is hidden from the users to a second position that is visible to the users.

19 Claims, 8 Drawing Sheets

(56) References Cited

U.S. PATENT DOCUMENTS

| | | | |
|---|---|---|---|
| 2010/0318426 A1 | 12/2010 | Grant et al. | |
| 2011/0082757 A1* | 4/2011 | Bullock | G06Q 20/123 |
| | | | 705/26.1 |
| 2011/0145219 A1* | 6/2011 | Cierniak | G06F 16/9535 |
| | | | 707/709 |
| 2011/0302103 A1* | 12/2011 | Carmel | G06Q 30/0282 |
| | | | 705/347 |
| 2012/0232989 A1 | 9/2012 | Musgrove | |
| 2013/0018957 A1 | 1/2013 | Parnaby | |
| 2013/0044050 A1 | 2/2013 | Ylivainio | |
| 2013/0080427 A1 | 3/2013 | Cross | |
| 2013/0204833 A1 | 8/2013 | Pang | |
| 2013/0204871 A1 | 8/2013 | Wong | |
| 2013/0262564 A1* | 10/2013 | Wall | H04N 21/812 |
| | | | 709/203 |
| 2014/0013200 A1* | 1/2014 | White | H04N 21/4788 |
| | | | 715/230 |
| 2014/0019443 A1* | 1/2014 | Golshan | G06F 16/24578 |
| | | | 707/723 |

OTHER PUBLICATIONS

Ditesco, "Make Money Online with sponsored Comments: TalkAhead", Apr. 13, 2010, 9 pages.

James Johnson, "Facebook Begins Rolling Out Sponsored Comments", Social Daily News, Jun. 24, 2011, 6 pages.

Sponsored Views, The Washington Post, http://www.washingtonpost.com/sponsoredviews, downloaded Jun. 20, 2013.

\* cited by examiner

Content Page 406

V | V User  8:41 AM - Public                                    408
It's over 25 billion!

412

Over 25 billion songs sold >>
Customers have purchased more than 25 billion songs from Music Corp., a figure that reaffirms the company's position atop the digital music market. "We are grateful to...

414

410
38 Comments >>

416

M | Music Corp.  Feb 4, 2013  Sponsored Comment
Music Corp. is having a huge sale this week to celebrate this milestone!
www.musiccorp.com

418

J | Jack  11:23 AM
+Jill, that's the reason the price per song went to 1.29 - there are no more drm protected songs. Do what you wish with the newly purchased music.

Add a comment...

FIG. 4

Content Page
506

508

Over 25 billion songs sold
By Jon posted Jan 31, 2013

Customers have purchased more than 25 billion songs from Music Corp., a figure that reaffirms the company's position atop the digital music market. "We are grateful to...
Sign in to read more >>

510

516  Music Corp.  Sponsored Comment
Music Corp. is having a huge sale this week to celebrate this milestone!
www.musiccorp.com 518  Jack  11:23 AM
+Jill, that's the reason the price per song went to 1.29 - there are no more drm protected songs. Do what you wish with the newly purchased music.

520  Bob  11:55 AM

INCREASING COMMENT VISIBILITY

CROSS-REFERENCE TO RELATED APPLICATIONS

This application is a continuation application of, and claims priority to, U.S. patent application Ser. No. 15/697,200, titled "INCREASING COMMENT VISIBILITY," filed on Sep. 6, 2017, which is a continuation application of, and claims priority to, U.S. patent application Ser. No. 15/473,176, now U.S. Pat. No. 9,785,625, titled "INCREASING COMMENT VISIBILITY," filed on Mar. 29, 2017, which is a continuation application of, and claims priority to, U.S. patent application Ser. No. 13/929,683, now abandoned, titled "Presenting Sponsored Comments," filed on Jun. 27, 2013. The disclosure of the foregoing applications are incorporated herein by reference in their entirety for all purposes.

BACKGROUND

This specification relates to the selection and presentation of sponsored comments.

A comment is a remark or other content responsive or otherwise related to an item of information, for example, online content posted on a webpage. Many publishers of online content, such as a blog post, an article, or a social network post, allow visitors to post comments directed either to the posted content, to comments of others, or both. A comment can be presented on a webpage typically below the content to which the comment is directed.

SUMMARY

This specification describes technologies relating to presenting sponsored comments in connection with content posted on an online publication. A sponsored comment may be a comment created by a sponsor as a sponsored comment or upgraded by a sponsor from an unsponsored comment to a sponsored comment. A sponsored comment may be selected from among previously created comments stored in a data repository for presentation in connection with posted content. The selected sponsored comment may be relevant to a context of the posted content.

In general, one innovative aspect of the subject matter described in this specification can be implemented in methods that may include maintaining an account for a sponsor; receiving a request by the sponsor to upgrade a comment previously posted in a comment field associated with online content of an online publication; modifying the presentation of the comment to reflect the upgrade of the comment; and updating the account for the sponsor based on the upgrade of the comment.

These and other implementations can optionally include one or more of the following features. The method may include detecting that the comment has low visibility to the users viewing the online content on the online publication. Detecting that the comment has low visibility may include determining that a number of a plurality of comments presented in the comment field exceeds a threshold number. Detecting that the comment has low visibility may include determining that a number of comments appearing before the comment in the comment field exceeds a threshold number. Detecting that the comment has low visibility may include detecting that the comment will be hidden from the users when the online content is presented to the users. Modifying the presentation of the comment to reflect the upgrade of the comment may include modifying a position of the comment in relation to positions of a plurality of comments presented in the comment field to increase visibility of the comment to the users. Modifying the position of the comment may include modifying the position of the comment from a position that is hidden from the users to a position that is visible to the users. Modifying the presentation of the comment to reflect the upgrade of the comment may include modifying a presentation style of the comment to reflect the upgrade of the comment. The comment is associated with a sponsor who pays to upgrade the comment, and the method may include determining that a price to be paid by the sponsor to upgrade the comment exceeds a threshold price.

Another innovative aspect of the subject matter described in this specification can be implemented in methods that may include determining a context of a post on an online publication, the post having comments relating to the post, at least some of the comments being sponsored comments; selecting, based on the determined context, a sponsored comment from among the sponsored comments, each of the sponsored comments being associated with a sponsor and available for selection prior to determining of the context of the post, the selected sponsored comment being relevant to the context of the post; and transmitting data associated with the selected sponsored comment to change the presentation of the selected sponsored comment in connection with the post.

These and other implementations can optionally include one or more of the following features. The method may include detecting the post made at the online publication, wherein determining the context of the post comprises determining the context of the post in response to detecting the post. The method may include receiving a request for a sponsored comment to be presented in connection with the post, wherein determining the context of the post comprises determining the context of the post in response to receiving the request. Determining the context of the post may include performing at least one of sentiment analysis or semantic analysis of content associated with the post. Determining the context of the post may include determining the context of the post based on at least one of: content of the post, content of comments presented in connection with the post, one or more links embedded in the post, one or more keywords associated with the post, or one or more interests of a user who views the post. The method may include maintaining a data repository of the sponsored comments including the selected sponsored comment prior to determining of the context of the post, wherein transmitting data associated with the selected sponsored comment comprises transmitting the selected sponsored comment to the online publication to change the presentation of the selected sponsored comment in connection with the post. Selecting the sponsored comment comprises selecting the sponsored comment from among the sponsored comments stored in a data repository maintained by a publisher of the online publication; and transmitting data associated with the selected sponsored comment comprises transmitting an identifier of the selected sponsored comment to change the presentation of the selected sponsored comment in connection with the post. Transmitting data associated with the selected sponsored comment may include transmitting data indicating a position of the sponsored comment in a comment field of the post. The method may include receiving a price to be paid by the sponsor of the selected sponsored comment to change the presentation of the sponsored comment; and determining that the price exceeds a threshold price. The method may include receiving a price to be paid by the sponsor of the selected sponsored comment to change the presentation of the sponsored comment; determining prices to be paid by sponsors of other relevant sponsored comments to change presentation of the other relevant sponsored comments; and determining that the price to be paid by the sponsor of the selected sponsored comment exceeds the prices to be paid by the sponsors of the other relevant sponsored comments.

Another innovative aspect of the subject matter described in this specification can be implemented in methods that may include determining a context of a post on an online publication; detecting that a comment relevant to the determined context has low visibility to users viewing the post on the online publication, the comment being included in a plurality of comments presented in a comment field associated with the post; and modifying the detected low visibility comment to increase visibility of the comment to the users.

These and other implementations can optionally include one or more of the following features. The method may include receiving a request to increase visibility of the comment to the users. The method may include updating an account associated with a sponsor of the comment based on the increase in visibility of the comment to the users.

Particular implementations of the subject matter described in this specification may be implemented to realize one or more of the following potential advantages. High traffic blog or social media posts may be monetized through sponsored comments. Sponsors can upgrade comments from unsponsored comments to sponsored comments to help ensure that the comments get some visibility even after the associated article or other posted content generates a large volume of comments that otherwise might bury the sponsors' comments, for example, by causing them to scroll off a user's screen out of view. Sponsors may use sponsored comments to help ensure that their messages are heard alongside differing opinions.

Details of one or more implementations of the subject matter described in this specification are set forth in the accompanying drawings and description below. Other features, aspects, and potential advantages of the subject matter will become apparent from the description, the drawings, and the claims.

DETAILED DESCRIPTION

Figure 1:
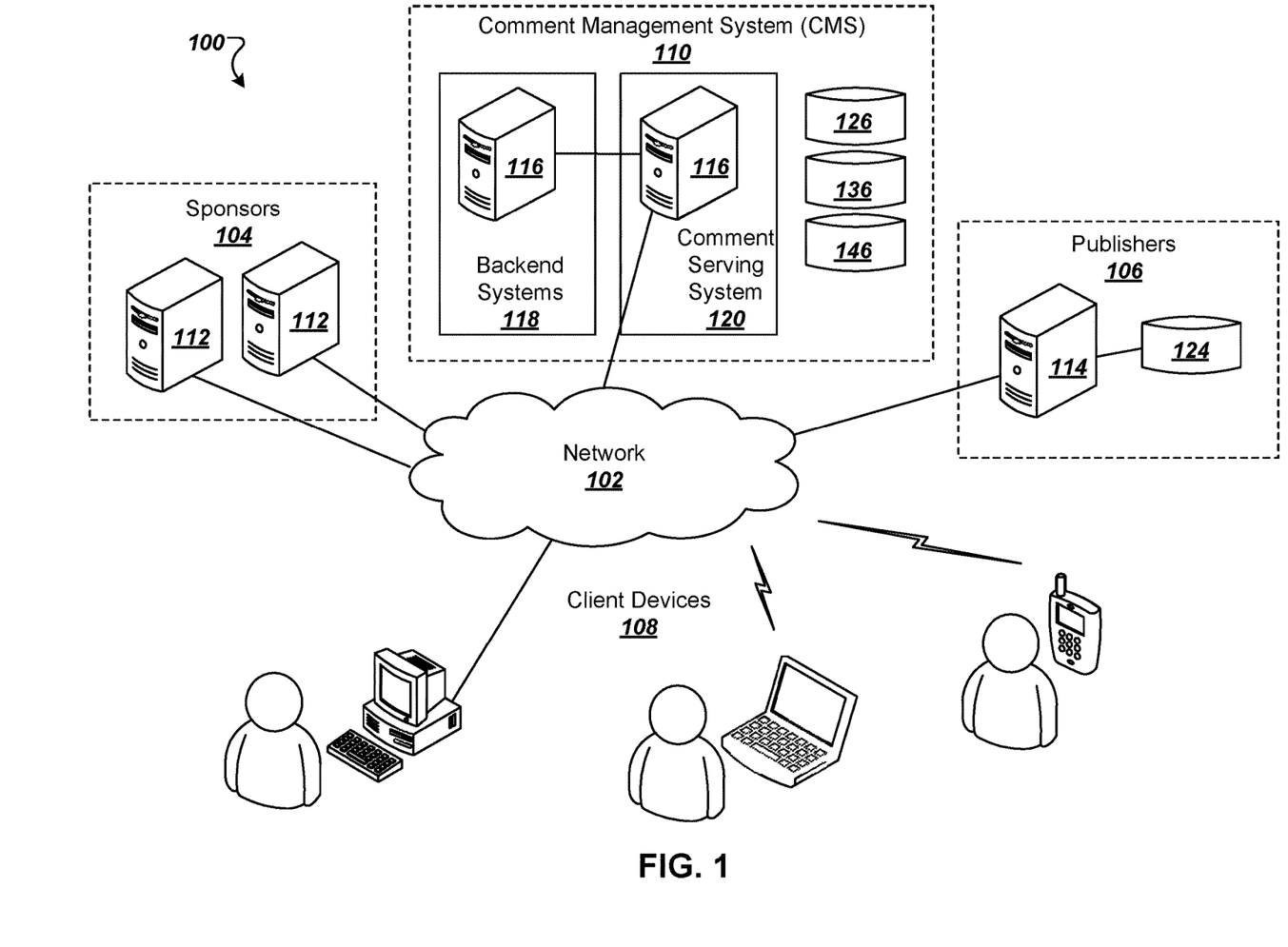
FIG. 1 is a block diagram of an example environment in which sponsored comments can be presented in connection with content on an online publication.

FIG. 1 is a block diagram of an example environment 100 in which sponsored comments can be presented in connection with content on an online publication. A network 102, such as a local area network (LAN), wide area network (WAN), the Internet, a wired network, a wireless network, or a combination thereof, connects sponsors 104, publishers 106, client devices 108, and a comment management system (CMS) 110. The environment 100 may connect many thousands of sponsors 104, publishers 106, and client devices 108. Each of the entities 102, 104, 106, 108, and 110 may be implemented or associated with hardware components, software components, firmware components, or any combination of such components. The entities 102, 104, 106, 108, and 110 can, for example, be implemented or associated with general purpose servers, software processes and engines, various embedded systems, or any combination. The entities 102, 104, 106, and 110 may serve, for example, as a sponsored comment distribution network. While reference is made to distributing sponsored comments to client devices 108, the environment 100 can be suitable for distributing other forms of content including other forms of sponsored content.

The sponsors 104 may provide or be associated with products or services. The sponsors 104 may include or be associated with, for example, retailers, wholesalers, warehouses, manufacturers, distributors, health care providers, educational establishments, financial establishments, technology providers, energy providers, utility providers, or any other product or service providers or distributors. The sponsors may include or maintain one or more data processing systems 112, such as servers or embedded systems, coupled to the network 102. The sponsors 104 may include or maintain one or more processes that run on one or more data processing systems.

The sponsors 104 may be associated with sponsored comments. A sponsor 104 may pay to have a sponsored comment presented to a user of a client device 108. A sponsored comment may include, for example, a commercial promotion, a public service announcement, a review, an opinion, or other communication related to content with which the sponsored comment is presented. A sponsored comment may include graphics, text, images, audio, video, or a combination. A sponsored comment may include embedded information, such as embedded media, links, meta-information, machine executable instructions, or a combination.

The publishers 106 may include content providers with an Internet presence, such as online publication and news providers (e.g., online newspapers, online magazines, or television websites), online service providers (e.g., financial service providers or health service providers), and other content providers. The publishers 106 may include or maintain one or more data processing systems 114, such as servers or embedded systems, coupled to the network 102. The publishers 106 may include or maintain one or more processes that run on data processing systems. The publishers 104 may include one or more data repositories 124 for storing information.

The publishers 106 may include entities that generate, maintain, provide, present, or process online content and online publications in the environment 100. The term "content" refers to various types of presented information, such as articles, discussion threads, reports, analyses, financial statements, music, video, graphics, search results, web page listings, information feeds (e.g., RSS feeds), and other web-based information. The term "publication" refers to any data that can be provided by the publisher 106 over the network 102. Publications can include, for example, HTML pages (e.g., web pages), word processing documents, or portable document format documents. A publication can include content, such as text or images, and may include embedded information, such as meta-information or hyperlinks, and/or embedded instructions, such as markup language (e.g., XML, HTML, etc.), scripts (e.g., JavaScript scripts), or applets. A publisher 106 of a publication may define content item environments, such as comment sections, field, or slots, in which comments can be presented in connection with a post, such as an article, a report, a video, a status update, or any other online content, on the publication. These content item environments can be defined in the publication or defined for presentation with the publication.

A client device 108 is an electronic device that is under the control of a user and is capable of requesting and receiving publications and content over the network 102. Example client devices 108 include personal computers, mobile communication devices, and other devices that can send and receive data over network 102. A client device 108 typically includes a user application, such as a web browser, to facilitate the sending and receiving of data over the network 102. The application can enable a user to display and interact with text, images, videos, music, and other information presented in a publication typically located at a website on the World Wide Web or a local area network. The client device 108 can include various other elements, such as processes running on various machines.

A client device 108 sends a request to a server of a publisher 106. The request may be a request for a publication, such as a web page. The publisher 106 receives the request from the client device 108 and provides or presents the publication to the client device 108. The publisher 106 may provide or present the publication via various mediums and in various forms, including web-based and non-web-based mediums and forms. The publisher 106 may generate and maintain the publication or retrieve the publication from other network resources.

The publishers 106 may be configured to integrate or combine retrieved content with one or more sponsored comments that are related or relevant to the retrieved content for display to users. In some implementations, the relevant sponsored comments may be provided from the CMS 110 and be combined with content for display to users. The publishers 106 may retrieve content for display on a client device 108 and then forward the content to the client device 108 along with code that causes the sponsored comments from the CMS 110 to be displayed to the user. In some implementations, the publishers 106 may retrieve content, retrieve one or more sponsored comments (e.g., from the CMS 110, the sponsors 104, or the data repositories 124), and then integrate the content and the sponsored comments to form a publication for display to the user.

The CMS 110 manages sponsored comments and provides various services to the sponsors 104, the publishers 106, and the client devices 108. The CMS 110 may store sponsored comments in a data repository 126 and facilitate the selection and distribution of sponsored comments through the environment 102 to the client devices 108. The CMS 110 may include one or more data processing systems 116, such as servers or embedded systems, coupled to the network 102. In some implementations, the CMS 110 may include a comment serving system 120 and one or more backend systems 118. The comment serving system 120 may include one or more data processing systems 116 and may perform functionality associated with delivering sponsored comments to publishers 106 or client devices 108. The backend systems 118 may include one or more data processing systems 116 and may perform functionality associated with identifying relevant sponsored comments to deliver, generating reports, maintaining accounts and usage information, and other backend system processing and maintenance. The CMS 110 can use the backend processing systems 118 and the comment serving system 120 to provide sponsored comments from the sponsors 104 through the publishers 106 to the client devices 108.

The CMS 110 may include one or more interface or frontend modules for providing various features to the sponsors 104, the publishers 106, and the client devices 108. For example, the CMS 110 may provide one or more publisher front-end interfaces (PFEs) for allowing publishers to interact with the CMS 110. The CMS 110 may also provide one or more sponsor front-end interfaces (SFEs) for allowing sponsors to interact with the CMS 110. In some implementations, the front-end interfaces may be configured as web applications that provide users with network access to features available in the CMS 110.

The front-end interfaces may include or generate physical or virtual mechanisms by which a user (or system) can input information to the CMS 110 and by which a user (or system) can perceive information generated by the CMS 110. In some implementations, the front-end interfaces may include or generate visual interfaces, such as graphical user interfaces (GUIs). Other types of interfaces can also be used. The interfaces can include one or more physical or virtual elements or widgets that allow a user (or system) to view, select, or indicate information.

The CMS 110 provides various comment management features to the sponsors 104.

The CMS 110 may allow the sponsors 104 to set up user accounts, set account preferences, create comments, select keywords for comments, create campaigns or initiatives for multiple products or businesses, view reports associated with accounts, analyze costs and return on investment, select customers or audience segments in different regions, select particular publishers, select particular contexts of online publications, monitor and evaluate financial information, monitor and evaluate comment performance, estimate comment traffic, access keyword tools, add graphics and animations to comments, and other features.

The CMS 110 may allow the sponsors 104 to create comments and input criteria, such as context or keywords, for which those comments will appear. The CMS 110 may select sponsored comments that are relevant to publisher sites, site content, and publisher audiences. The CMS 110 may select a sponsored comment based on context of the content associated with the publication, context of the sponsored comment, or both. The context of the content associated with the publication may be determined from the text of a post, an article, or a comment on the publication. The context of the content associated with the publication may be determined from content linked to the publication, such as text of a comment on another publication that links to the requested article or set of articles about the same event.

The CMS 110 may determine the context of a publication by, for example, parsing the content associated with the publication. The CMS 110 may determine the context of a publication by performing a sentiment analysis, a semantic analysis, or both on the content, and provide a sponsored comment based on the analysis. For example, the CMS 110 may select different sponsored comments for presentation with content that is positive, e.g., a positive review for a product, than for content that is negative, e.g., a negative review for a product. A sponsor 104 can specify such contextual analysis as an input criterion to ensure that the sponsor's message is heard alongside differing opinions.

The CMS 110 may allow the sponsors 104 to upgrade previously created comments to sponsored comments. A sponsor 104 can upgrade a comment to ensure that the comment gets some visibility even after the publication generates a large volume of comments that may bury the sponsor's comment. The CMS 110 may detect that an upgraded comment on a publication has low visibility to users viewing the publication and modify the comment to increase its visibility to users. The CMS 110 may modify the comment by, for example, moving the comment within the comment section of the publication, presenting the comment in a visible position of the comment section, or modifying a presentation style of the comment. The comment serving system may modify the presentation style by specifying attributes and parameters (e.g., JavaScript parameters) for the comment, such as size (e.g., maximum number of characters), shape, color, font, or type.

The CMS 110 may select or modify comments from sponsored comments previously created by the sponsors 104 and stored in the CMS's data repository 126, a publisher's content repository 124, the sponsor's data repository, or some other source. The CMS 110 may display sponsored comments on a client device 108 using one or more embeddable display elements that allow sponsored comments to be displayed to users with publisher content. An "embeddable display element" refers to any element that can be embedded in a publication (e.g., a publisher webpage) that allows information (e.g., a sponsored comment) from an external source (e.g., the CMS 110) to be displayed in the publication. The CMS 110 may use embeddable display elements to insert relevant sponsored comments in websites and webpages displaying publisher content, such as an article or a post. A sponsored comment may include information such as a username, an avatar image, comment text, and one or more links to the sponsor's web page or web site. A sponsored comment may have a format that is compatible with a variety of web pages and web sites, or a format that is site specific.

The CMS 110 may also allow the sponsors 104 to set bids (offer price) for comments. A bid may represent the maximum amount a sponsor is willing to pay for presentation of a comment to a user or to upgrade a previously posted comment. The bid may be based on a number of impressions, click-through rate, or other user interaction with the comment. A click-through can include any action a user takes to select a comment. The sponsors 104 may also choose a currency and monthly budget.

The CMS 110 may determine that a price (or bid) offered by the sponsor 104 exceeds a threshold price. Determining that the price exceeds the threshold price before presenting or upgrading a comment may prevent sponsored comments from being presented on each and every publication viewed by a user, may prevent too many sponsored comments from being presented on a single publication, or both. The threshold price may be determined based on a desired prevalence of sponsored comments in a publication, in a set of publications, in a set of publications viewed by a particular user, in a set of publications viewed by a set of users, or in any combination of publications and users. For example, if the desired prevalence of sponsored comments in a publication is a sponsored comment for every five unsponsored comments, the threshold price may be set such that a bid exceeds the threshold price on average every five auctions. To determine a threshold price, browsing activities of a particular user or a set of users may be analyzed to determine a threshold price. A different threshold price may be determined for each publication, each user, a set of publications, or a set of users, or any combination of publications and users.

The CMS 110 may also allow the sponsors 104 to view information about the comments, which may be maintained by the CMS 110. The CMS 110 may be configured to determine and maintain the number of impressions relative to a particular web site, context, or keyword. The CMS 110 may also determine and maintain the number of click-throughs for a comment as well as the ratio of click-throughs to impressions.

The CMS 110 may also allow the sponsors 104 to select and/or create conversion types for comments. A "conversion" may occur when a user consummates a transaction related to a given comment. For example, a conversion can be defined to occur when a user clicks on a comment, is referred to the sponsor's web page, and consummates a purchase there before leaving that web page. In another example, a conversion can be defined as the display of a sponsored comment to a user and a corresponding purchase on the sponsor's web page within a predetermined time (e.g., seven days). Other forms of conversion are possible. The sponsors 104 may additionally input a cost or a value associated with selected conversion types, such as a five dollar credit to the publishers 106 for each product or service purchased. The CMS 110 may store conversion data and other information in a conversion data repository 136.

The CMS 110 may maintain financial accounts for the entities in the environment 100. The CMS 110 may manage and process financial transactions among and between the entities in the environment 100. For example, the CMS 110 may credit accounts associated with the publishers 106 and debit accounts associated with the sponsors 104. These and other transactions may be based on conversion data, impressions information, click-through rates, or a combination of information received and maintained by the CMS 110.

For purposes of explanation only, certain aspects of this disclosure are described with reference to the discrete elements illustrated in FIG. 1. The number, identity, and arrangement of elements in the environment 100 are not limited to what is shown. For example, the environment 100 can include any number of geographically-dispersed sponsors 104, publishers 106, and client devices 108, which may be discrete, integrated modules or distributed systems. Similarly, the environment 100 is not limited to a single CMS 110 and may include any number of integrated or distributed CMS systems or elements.

Furthermore, additional or different elements not shown may be contained in or coupled to the elements shown in FIG. 1, or certain illustrated elements may be absent. In some examples, the functions provided by the illustrated elements can be performed by less than the illustrated number of components or even by a single element. The illustrated elements can be implemented as individual processes run on separate machines or a single process running on a single machine.

Figure 2:
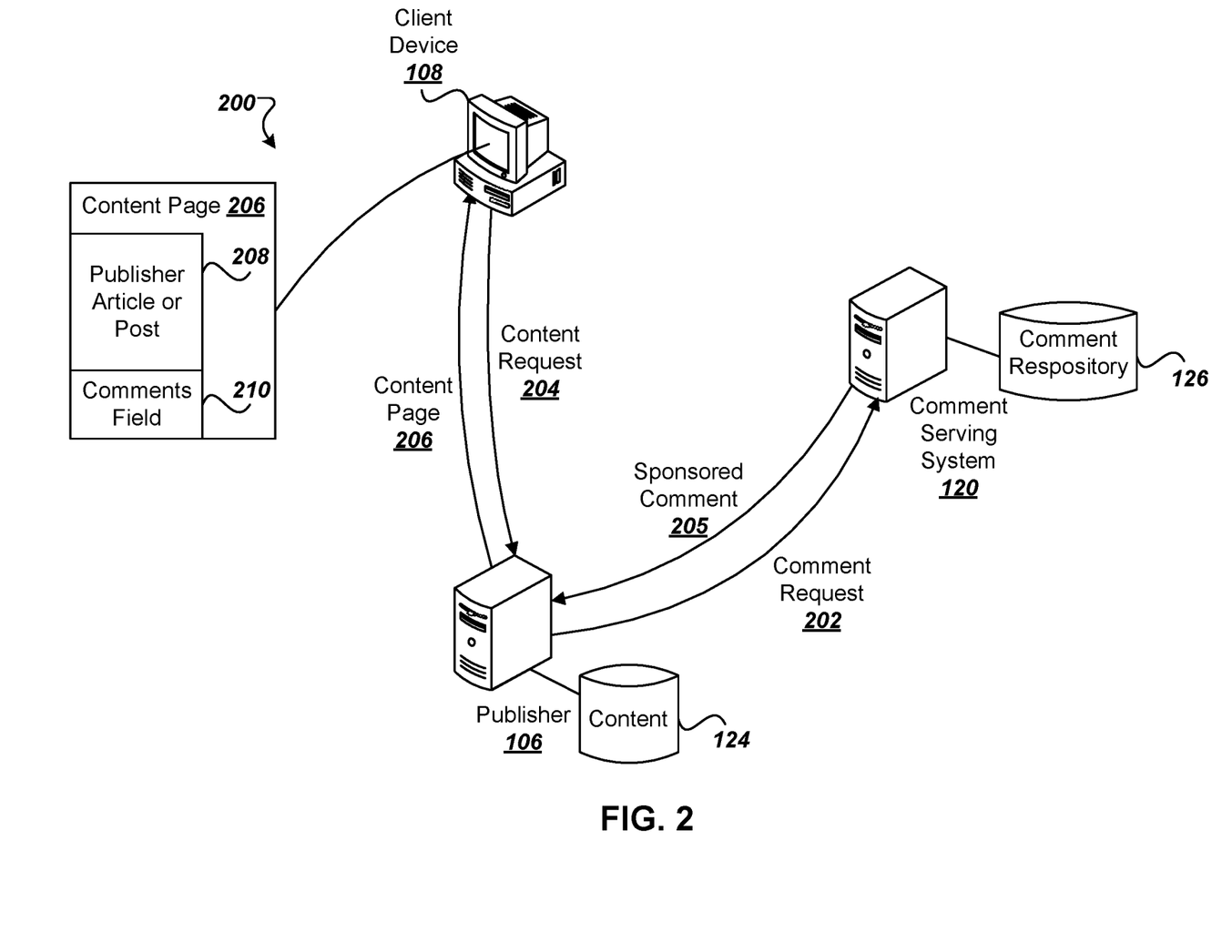
FIG. 2 shows an example of data flow within the environment for selecting a sponsored comment from sponsored comments stored in a data repository of a comment serving system.

FIG. 2 shows an example of data flow 200 within the environment 100 for selecting a sponsored comment from sponsored comments stored in a data repository of a comment serving system. During the data flow 200, the publisher

106 may receive a content request 204 from a particular client device 108. The content request 204 may include, for example, a request for a web document that includes an article or a post.

In response to receiving the content request 204, the publisher 106 may send a comment request 202 to the comment serving system 120. The comment request 202 is a request for a sponsored comment. In some implementations, the comment request 202 may include content, such as the content requested by the client device 108, retrieved from the content repository 124 or some other source. In some implementations, the comment request 202 may include one or more identifiers (e.g., a page identifier (or URL) and a post identifier) that the comment serving system 120 can use to retrieve the content requested by the client device 108 from the content repository 124 or some other source. The comment request 202 may include formatting and other information (e.g., a comment rendering template). This information may include attributes and parameters (e.g., JavaScript parameters) for sponsored comments, such as size (e.g., maximum number of characters), shape, color, font, or type (e.g., audio, video, graphical, textual, etc.). The information may specify a quantity of sponsored comments requested.

In response to receiving the comment request 202, the comment serving system 120 may determine a context of the content requested by the client device 108. Based on the determined context of the content, the comment serving system 120 selects a sponsored comment from the comment repository 126. The sponsored comment may include information such as a username, an avatar image, comment text, and one or more links to the sponsor's web page or web site. The sponsored comment may be formatted according to the formatting information received from the publisher 106. The comment serving system 120 sends the selected sponsored comment 205 to the publisher 106 for presentation with the publisher's content.

The publisher 106 sends a content page 206 or other presentation to the requesting client device 108. The content page 206 may include the publisher's content 208, e.g., an article or post, and a comments field 210. The comments field 210 may include the selected sponsored comment 205 and one or more other comments.

Figure 3:
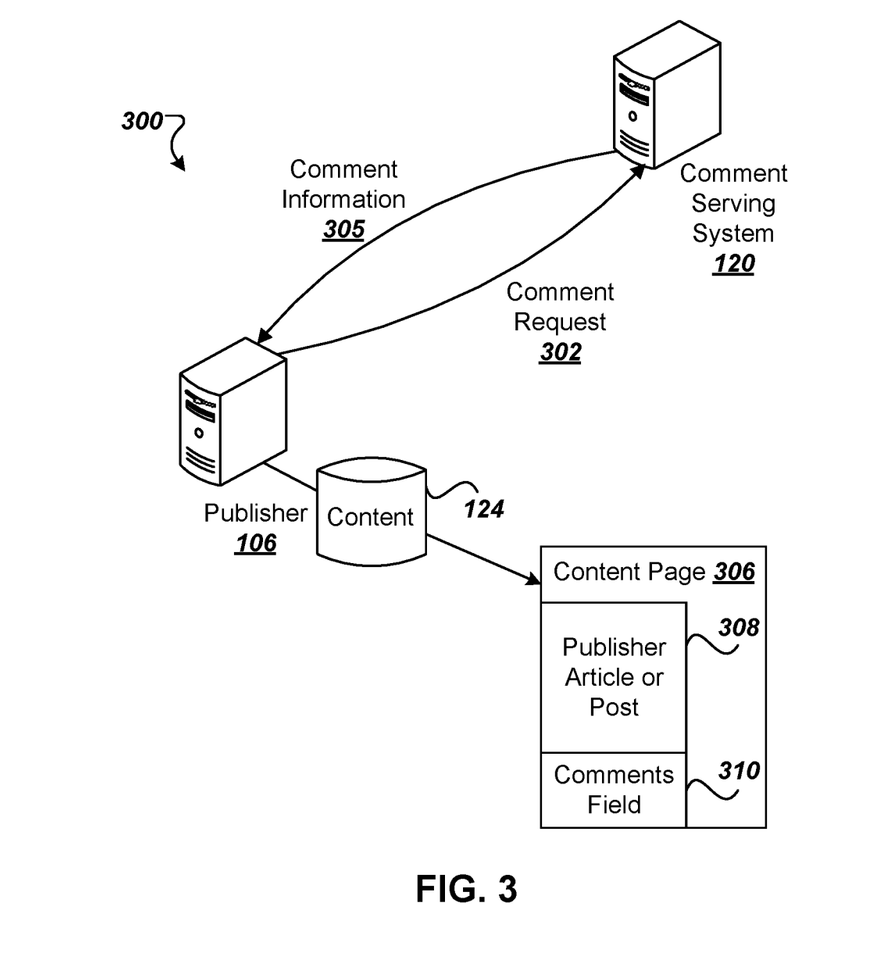
FIG. 3 shows an example of data flow within the environment for selecting or modifying a sponsored comment stored in a data repository of a publisher

FIG. 3 shows an example of data flow 300 within the environment 100 for selecting or modifying a sponsored comment stored in a data repository of a publisher. During the data flow 300, the publisher 106 sends a comment request 302 to the comment serving system 120. In some implementations, the comment request 302 may include the publisher's content, such as an article or a post and comments, retrieved from the content repository 124 or some other source. In some implementations, the comment request 302 may include one or more identifiers, such as a page identifier, a post identifier, and comment identifiers, that the comment serving system 120 can use to retrieve the publisher's content from the content repository 124 or some other source. The comment request 302 may include formatting information, e.g., a page template, that includes attributes and parameters rendering the content page 306. The comment request 302 may include information specifying positions of comments presented in the comments field 310.

In some implementations, the publisher 106 may send a comment request 302 to the comment serving system 120 in response to detecting a posting of an article or post 308 made on the content page 306 by a user. In some implementations, the publisher 106 may send a comment request 302 to the comment serving system 120 in response to a user's request for the content page 306. In such cases, the comment request 302 may be a request for the comment serving system 120 to select a publisher-owned comment for presentation with the article or post 308 on the content page 306.

In some implementations, the publisher 106 may send a comment request 302 to the comment serving system in response to a sponsor's request to upgrade a comment previously posted on the content page 306. Although FIG. 3 shows the comment request 302 being sent from the publisher 106, the comment request 302 to upgrade a comment previously posted on the content page 306 may be sent by a sponsor to the comment serving system 120. In such cases, the comment request 302 may include a request for the comment serving system 120 to modify the upgraded comment to reflect the upgrade of the comment.

In response to receiving the comment request 302, the comment serving system 120 may analyze the publisher's content received with or retrieved according to the comment request 302. The comment serving system 120 may perform context analysis on the article or post, the publisher-owned sponsored comments, or both. To determine whether to modify an upgraded comment, the comment serving system 120 may perform visibility analysis on the upgraded comment. Based on the results of the analyses, the comment serving system 120 selects or modifies a publisher-owned sponsored comment for presentation with the article or post 308 to the user.

The comment serving system 120 sends comment information 305 to the publisher. The comment information 305 may include a comment identifier that identifies the selected or modified comment. The comment information 305 may include position information that specifies the position of the selected or modified comment in relation to positions of other comments in the comments field 310. The comment information 305 may include attributes and parameters (e.g., JavaScript parameters) for the selected or modified comment, such as size (e.g., maximum number of characters), shape, color, font, or type (e.g., audio, video, graphical, textual, etc.).

The publisher 106 may store the content page 306 in the content repository 124. The publisher 106 may present the content page 306 to a user requesting the content page 306. The content page 306 may include the publisher's content 308, e.g., the article or post, and a comments field 310. The comments field 310 may include the selected or modified sponsored comment 305 and one or more other comments.

Figure 4:
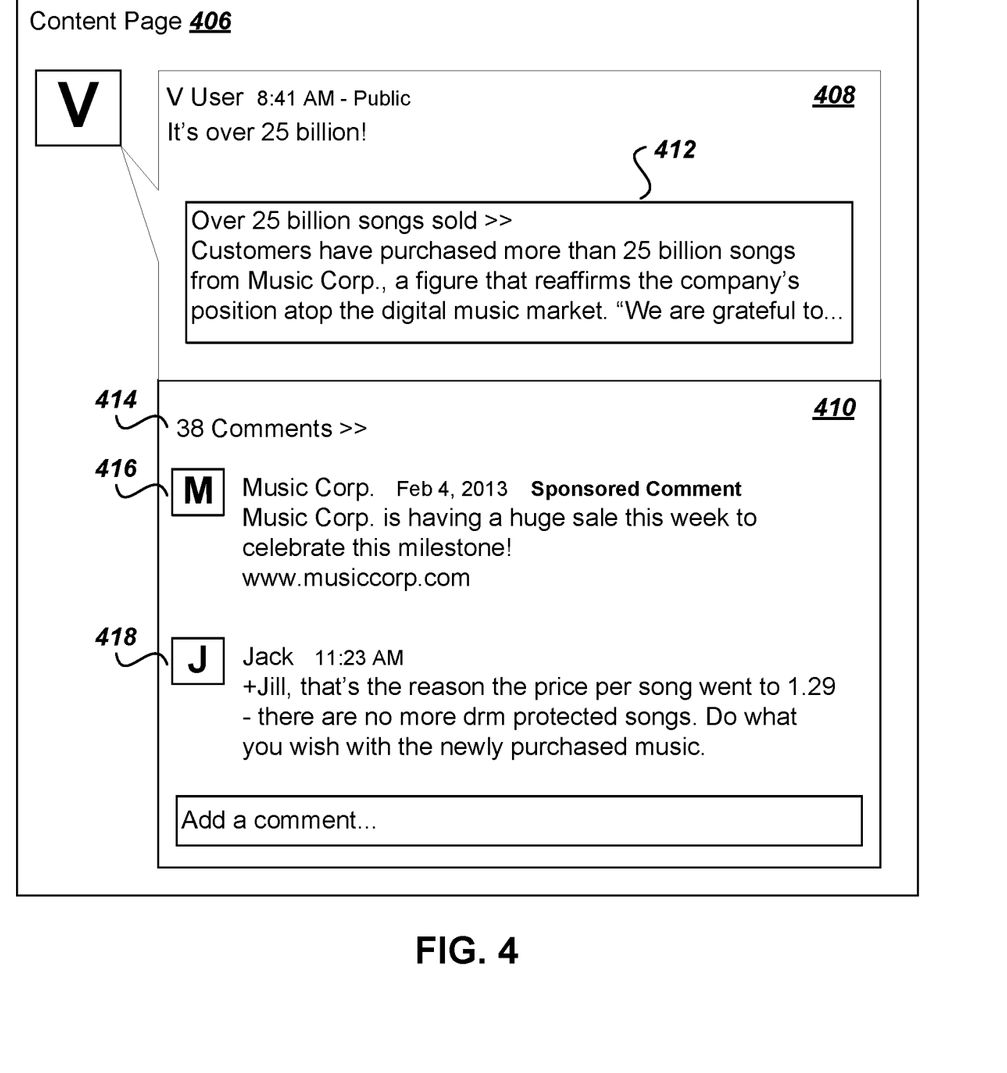
FIG. 4 shows an example content page that includes a social media post and a comments field.

FIG. 4 shows an example content page 406 that includes a social media post 408 and a comments field 410. The social media post 408 includes a link and snippet 412 to an article on an online publication. The comments field 410 includes a link 414 to hidden comments, a sponsored comment 416, and a viewer's comment 418. A user may click on the link 414 to view additional comments.

Figure 5:
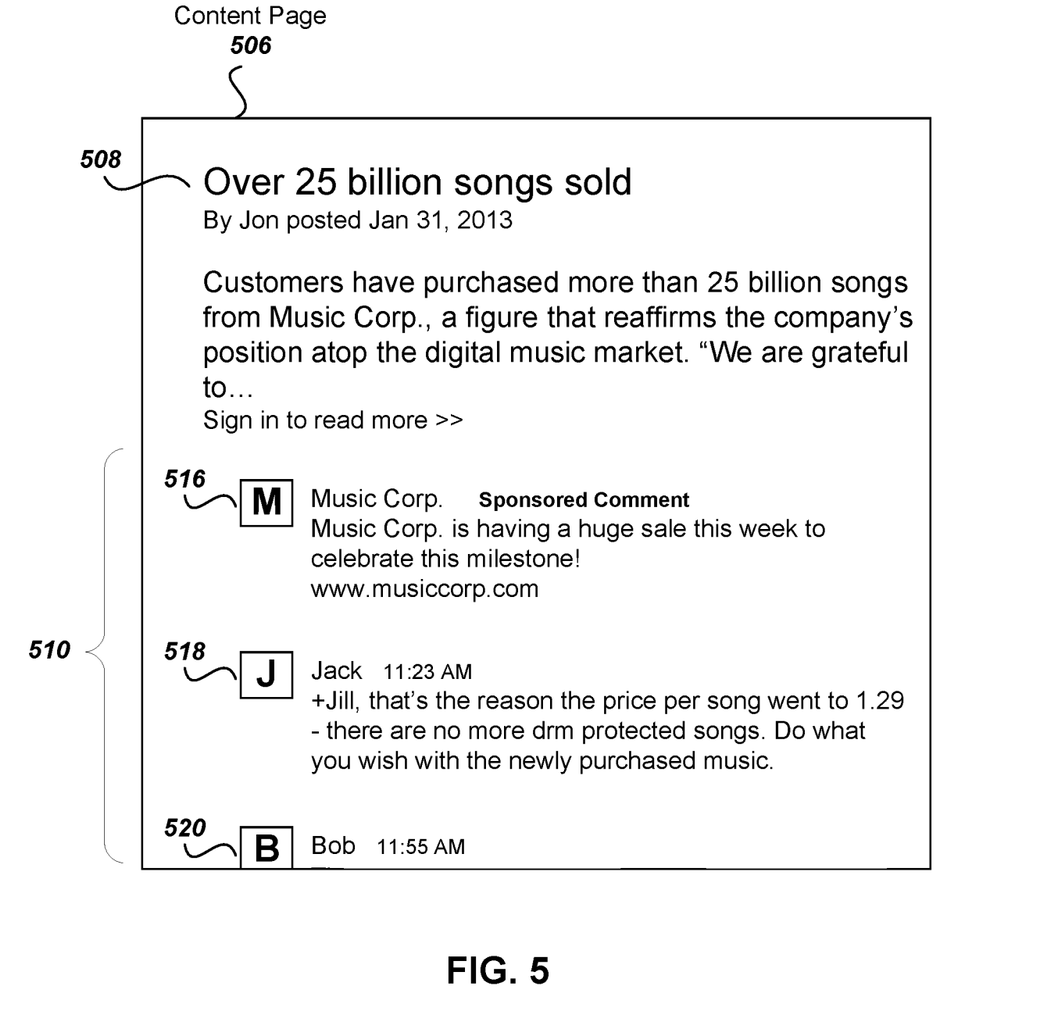
FIG. 5 shows an example content page that includes an article and a comments field.

FIG. 5 shows an example content page 506 that includes an article 508 and a comments field 510. The comments field 510 includes a sponsored comment 516, a viewer's comment 518, and a partially hidden comment 520. The partially hidden comment 520 and additional comments below the partially hidden comment 520 in the comments field 510 may be viewed by scrolling down the content page 506.

Figure 6:
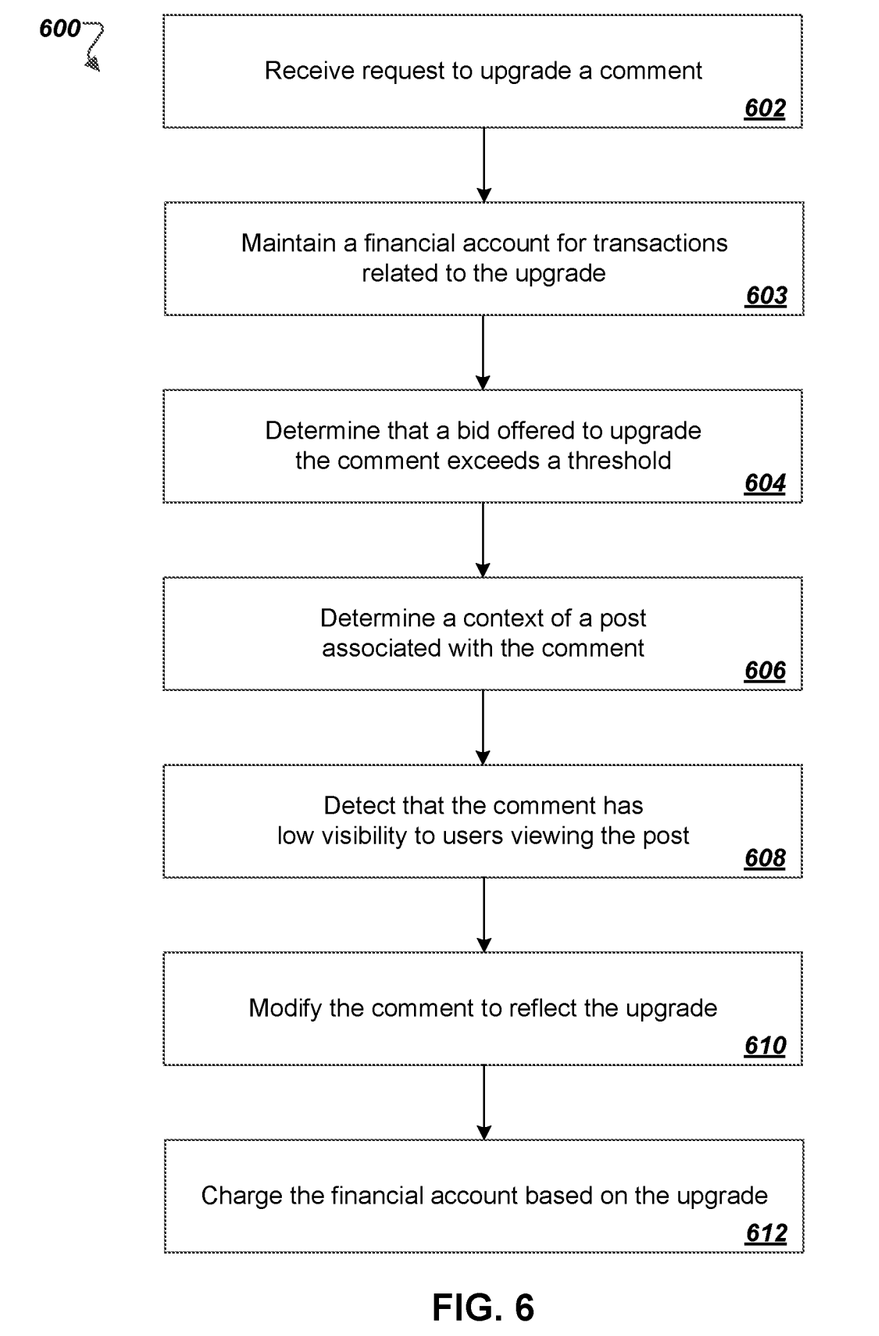
FIG. 6 is a flowchart of an example process for modifying a comment to reflect an upgrade of the comment.

FIG. 6 is a flowchart of an example process 600 for modifying a comment to reflect an upgrade of the comment. The process 600 may be performed by a comment serving system that includes one or more computers, such as the comment serving system 120 of FIG. 1.

At 602, the comment serving system receives a request to upgrade a comment previously posted in a comment field associated with a post on an online publication. In some implementations, the request may be received from a sponsor who pays to upgrade the comment. In some implementations, the request may be received from a publisher that allows sponsors to pay to upgrade comments.

At 603, the comment serving system may maintain a financial account for a sponsor, a publisher, or both for transactions related to the upgrade to the comment. At 604, the comment serving system may determine that a price (or bid) offered by the sponsor to upgrade the comment exceeds a threshold price.

At 606, the comment serving system may determine a context of the post on the online publication. The comment serving system may determine the context of the post by performing a sentiment analysis, semantic analysis, or both of content associated with the post. The comment serving system may determine the context of the post based any information or content associated with the post, such as content of the post, content of comments presented in connection with the post, one or more links embedded in the post, one or more keywords associated with the post, one or more interests of a user who views the post.

At 608, the comment serving system may detect that the comment has low visibility to the users viewing the post on the online publication. The comment serving system may detect that the comment has low visibility by determining that a number of a plurality of comments presented in the comment field exceeds a threshold number, determining that a number of comments appearing before the comment in the comment field exceeds a threshold number, detecting that the comment will be hidden from the users when the post is presented to the users, or a combination.

At 610, the comment serving system modifies the comment to reflect the upgrade of the comment. The comment serving system may modify the comment by modifying a position of the comment in relation to positions of a plurality of comments presented in the comment field to increase visibility of the comment to the users, modifying the position of the comment from a position that is hidden from the users to a position that is visible to the users, modifying a presentation style of the comment to reflect the upgrade of the comment, or a combination. For example, the comment serving system may specify that the upgraded comment be positioned as the first visible comment in the comments field above all other comments in the comment field. The comment serving system may modify the presentation style by specifying attributes and parameters (e.g., JavaScript parameters) for the comment, such as size (e.g., maximum number of characters), shape, color, font, or type. At 612, the comment serving system may charge the financial account based on the upgrade of the comment.

Figure 7:
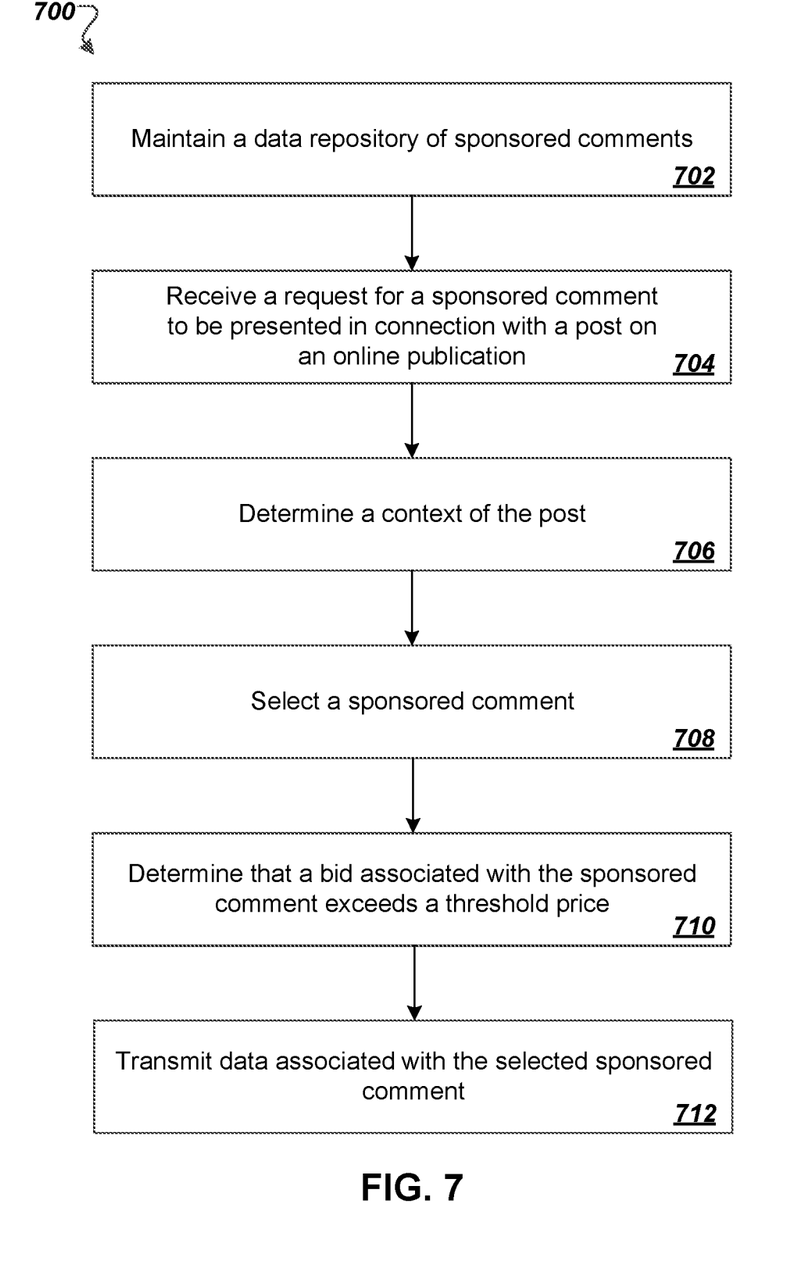
FIG. 7 is a flowchart of an example process for selecting a sponsored comment based a context of a online content on an online publication.

FIG. 7 is a flowchart of an example process 700 for selecting a sponsored comment based a context of online content on an online publication. The process 700 may be performed by a comment serving system that includes one or more computers, such as the comment serving system 120 of FIG. 1.

At 702, the comment serving system maintains a data repository of sponsored comments created by sponsors. Each sponsored comment is associated with a sponsor and is available for selection for presentation in connection with a post on an online publication. Each sponsored comment may include information such as a username, an avatar image, comment text, and one or more links to the sponsor's web page or web site. A sponsored comment may have a format that is compatible with a variety of web pages and web sites, or a format that is site specific.

At 704, the comment serving system receives a request for a sponsored comment to be presented in connection with a post on an online publication. The comment serving system may receive the request from a client device requesting to view the post or a publisher providing the post.

At 706, the comment serving system may determine a context of the post on the online publication. The comment serving system may determine the context of the post by performing a sentiment analysis, semantic analysis, or both of content associated with the post. The comment serving system may determine the context of the post based any information or content associated with the post, such as content of the post, content of comments presented in connection with the post, one or more links embedded in the post, one or more keywords associated with the post, one or more interests of a user who views the post.

At 708, the comment serving system selects a sponsored comment from among a plurality of sponsored comments. The selected sponsored comment may be relevant to the context of the post. The comment serving system may select the sponsored comment based on the determined context of the post. The comment serving system may select the sponsored comment from among the sponsored comments stored in the data repository maintained by the comment serving system or among sponsored comments stored in a data repository maintained by a publisher of the online publication.

At 710, the comment serving system determines a price to be paid by the sponsor of the selected sponsored comment for presentation of the sponsored comment. The comment serving system may determine that the price exceeds a threshold price. The threshold price may be determined based on a desired prevalence of sponsored comments. The threshold price may be determined by determining prices to be paid by sponsors of other relevant sponsored comments for presentation of the other relevant sponsored comments and determining that the price to be paid by the sponsor of the selected sponsored comment exceeds the prices to be paid by the sponsors of the other relevant sponsored comments.

At 712, the comment serving system transmits data associated with the selected sponsored comment to cause presentation of the selected sponsored comment in connection with the post. The comment serving system may transmit the selected sponsored comment or an identifier of the selected sponsored comment to a client device, a publisher, or both. The comment serving system may transmit data indicating a position of the sponsored comment in a comment field of the post.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 8:
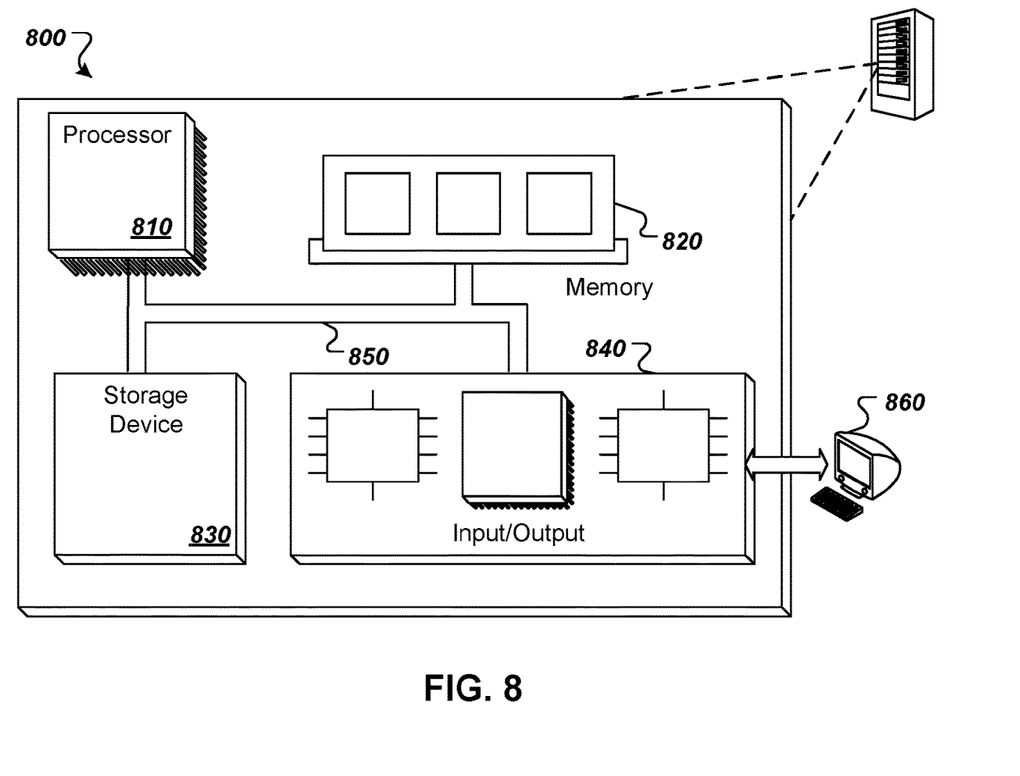
FIG. 8 shows a block diagram of a programmable processing system.

An example of one such type of computer is shown in FIG. 8, which shows a block diagram of a programmable processing system (system). The system 800 that can be utilized to implement the systems and methods described herein. The architecture of the system 800 can, for example, be used to implement a computer client, a computer server, or some other computer device.

The system 800 includes a processor 810, a memory 820, a storage device 830, and an input/output device 840. Each of the components 810, 820, 830, and 840 can, for example, be interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can, for example, include a hard disk device, an optical disk device, or some other large capacity storage device.

The input/output device 840 provides input/output operations for the system 800. In one implementation, the input/output device 840 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 860.

While this specification contains many specific implementation details, these should not be construed as limitations on the scope of any claims or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing apparatus, the method comprising:
   receiving, by the one or more data processing apparatus, a comment request for a comment to be included in a comments field of a content page;
   identifying, by the one or more data processing apparatus and for positioning in the comments field of the content page, a given comment from among a plurality of available comments based on content of one or more other comments already included in the comments field of the content page expressing differing opinions than the given comment; and
   positioning, by the one or more data processing apparatus, the given comment at a position within the comment field that provides more visibility than at least one of the other comments already included in the comments field of the content page.

2. The method of claim 1, further comprising:
   determining, by the one or more data processing apparatus, context of content presented in the content page, wherein the content includes subject matter and characterizations of subject matter of the content page;
   selecting, based on the determined context of the content page, a comment from a database of stored comments related to the context of the content page; and
   providing, for presentation, the comment to be presented with the content on the content page.

3. The method of claim 2, wherein determining the context of the content page comprises performing, by the one or more data processing apparatus, sentiment analysis and semantic analysis on the content presented in the content page.

4. The method of claim 3, wherein selecting the comment, comprising selecting the comment based on the sentiment analysis indicating a positive sentiment.

5. The method of claim 3, wherein selecting the comment based on the sentiment analysis indicating a negative sentiment.

6. The method of claim 1, further comprising:
   detecting, by the one or more data processing apparatus, that the given comment in the comment field has low visibility to the users viewing the online content; and
   in response to detecting that the given comment in the comment field has low visibility to the users viewing the online content, repositioning the given comment at a different position of the comment field that increases the visibility of the given comment to the users viewing the online content.

7. The method of claim 6, wherein the different position is a first visible position at a top of the comment field located positionally above all other comments in the comment field.

8. A system comprising:
   one or more data processing apparatus; and
   one or more non-transitory computer readable devices that include instructions that, when executed by the one or more data processing apparatus, cause the one or more data processing apparatus to perform operations comprising:
   receiving a comment request for a comment to be included in a comments field of a content page;
   identifying, for positioning in the comments field of the content page, a given comment from among a plurality of available comments based on content of one or more other comments already included in the comments field of the content page expressing differing opinions than the given comment; and positioning the given comment at a position within the comment field that provides more visibility than at least one of the other comments already included in the comments field of the content page.

9. The system of claim 8, wherein the instructions cause the one or more data processing apparatus to perform operations further comprising:

determining context of content presented in the content page, wherein the content includes subject matter and characterizations of subject matter of the content page;

selecting, based on the determined context of the content page, a comment from a database of stored comments related to the context of the content page; and providing, for presentation, the comment to be presented with the content on the content page.

10. The system of claim 9, wherein determining the context of content presented in the content page comprises performing sentiment analysis and semantic analysis on online content.

11. The system of claim 10, wherein selecting the comment comprises selecting the comment based on the sentiment analysis indicating a positive sentiment.

12. The system of claim 10, wherein selecting the comment comprises selecting the content based on the sentiment analysis indicating a negative sentiment.

13. The system of claim 8, wherein the instructions cause the one or more data processing apparatus to perform operations comprising:

detecting, by the one or more data processing apparatus, that the given comment in the comment field has low visibility to the users viewing the online content; and in response to detecting that the given comment in the comment field has low visibility to the users viewing the online content, repositioning the given comment at a different position of the comment field that increases the visibility of the given comment to the users viewing the online content.

14. The system of claim 8, wherein the different position includes a first visible position at a top of the comment field located positionally above all other comments in the comment field.

15. A non-transitory computer storage medium storing instructions that when executed by one or more data processing apparatus cause the one or more data processing apparatus to perform operations comprising:

receiving a comment request for a comment to be included in a comments field of a content page;

identifying, for positioning in the comments field of the content page, a given comment from among a plurality of available comments based on content of one or more other comments already included in the comments field of the content page expressing differing opinions than the given comment; and positioning the given comment at a position within the comment field that provides more visibility than at least one of the other comments already included in the comments field of the content page.

16. The non-transitory computer storage medium of claim 15, wherein the instructions cause the one or more data processing apparatus to perform operations further comprising:

determining context of content presented in the content page, wherein the content includes subject matter and characterizations of subject matter of the content page;

selecting, based on the determined context of the content page, a comment from a database of stored comments related to the context of the content page; and providing, for presentation, the comment to be presented with the content on the content page.

17. The non-transitory computer storage medium of claim 16, wherein determining the context of the content page comprises performing sentiment analysis and semantic analysis on online content.

18. The non-transitory computer storage medium of claim 17, wherein selecting the comment comprises selecting the comment based on the sentiment analysis indicating a positive sentiment.

19. The non-transitory computer storage medium of claim 17, wherein selecting the comment comprises selecting the comment based on the sentiment analysis indicating a negative sentiment.

* * * * *